United States Patent Office 3,067,693
Patented Dec. 11, 1962

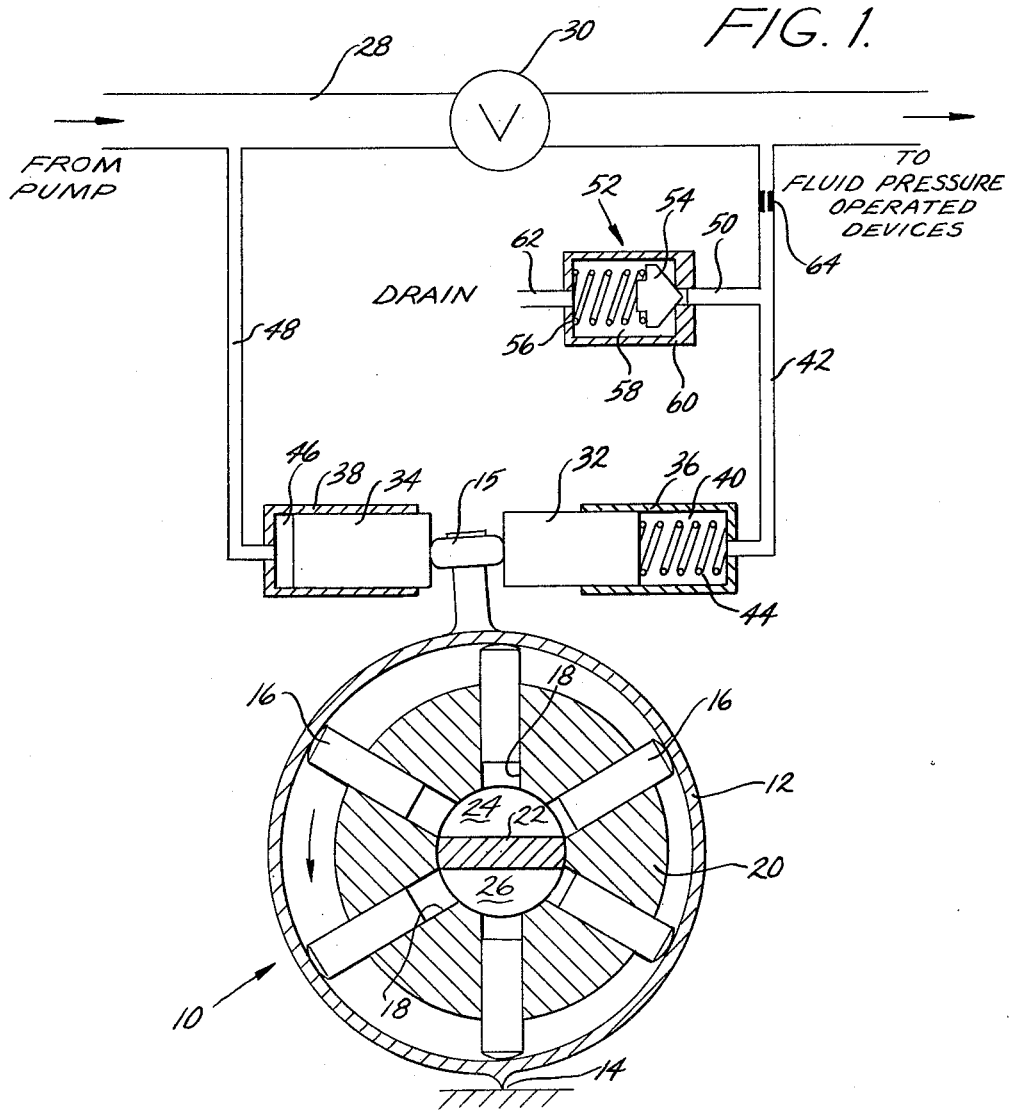

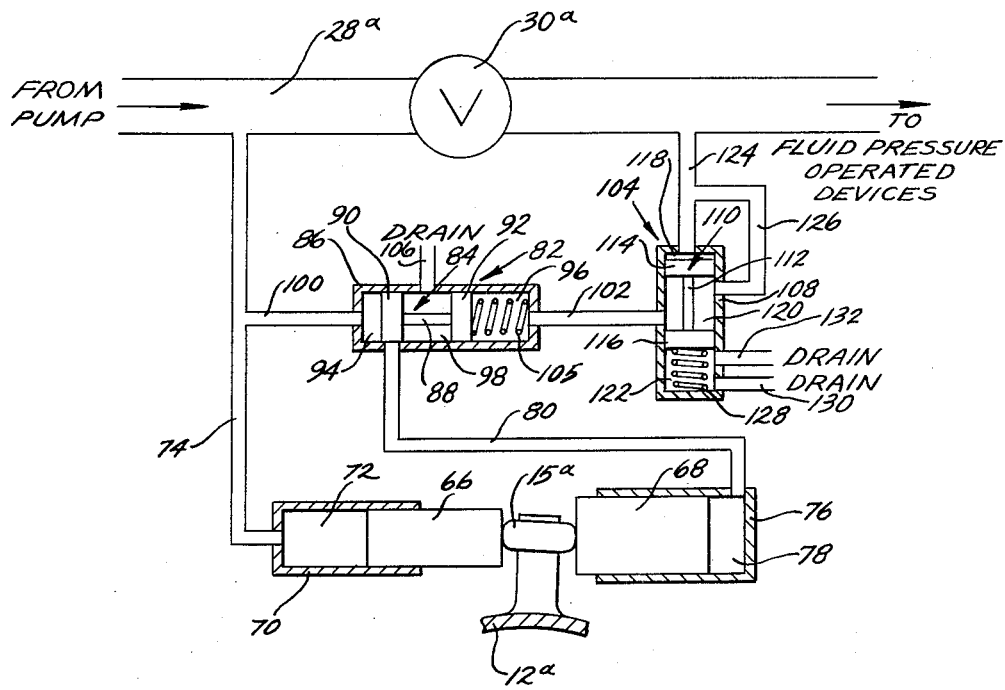

3,067,693
CONTROL MEANS FOR VARIABLE
DELIVERY PUMP
Raymond P. Lambeck, Simsbury, Conn., assignor to United Aircraft Corporation, East Hartford, Conn., a corporation of Delaware
Filed Dec. 24, 1958, Ser. No. 782,880
2 Claims. (Cl. 103—161)

This invention relates to variable delivery pumps and, more particularly, to control means therefor.

In a fluid pressure system wherein fluid discharged from a variable delivery pump is passed through a metering valve in a supply line serving one or more devices requiring pressurized fluid for their operation, it is conventional practice to insure satisfaction of the fluid flow and pressure requirements of said devices for all anticipated conditions of operation by providing a control means which varies the rate of delivery of the pump so that a predetermined constant fluid pressure is maintained in the supply line upstream of the metering valve. In order that the requirements of the devices served by the supply line may be satisfied for the most severe conditions of operation, a comparatively high constant pressure must be maintained in the line upstream of the metering valve. This comparatively high pressure is obviously not required for full satisfaction of the requirements of the devices served by the supply line under normal conditions of operation. Thus, the variable displacement pump is required to operate continuously at a comparatively high rate of delivery so as to maintain a high constant pressure upstream of the metering valve which such operation is for the most part unnecessary. In consequence, unnecessary wear of pump parts along with excessive heat generation and other detrimental effects are encountered.

It is the general object of the present invention to provide control means adapted to vary the rate of delivery of a variable delivery pump so that the pressure drop across a valve which meters pump discharge fluid is regulated in a manner that insures satisfaction of varying fluid flow and pressure requirements of devices supplied with fluid from the valve, the rate of delivery of the pump thus being varied more nearly in keeping with the requirements of the said devices than has heretofore been possible and unnecessary operation of the pump at high rates of delivery being avoided.

Another object of the invention is to provide control means adapted to vary the rate of delivery of a variable delivery pump so that the pressure drop across a valve which meters pump discharge fluid is maintained at a predetermined substantially constant level.

The drawings show two specific embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a schematic illustration of a fluid pressure system which includes a variable delivery pump and a pump control means embodying the present invention; and FIG. 2 is a schematic illustration of a fluid pressure system similar to FIG. 1, but showing an alternative pump control means.

Referring particularly to FIG. 1 of the drawings, it will be observed that a variable delivery pump which is shown schematically and indicated generally therein by the reference numeral 10 is the well known radial piston type. The control means of the present invention, however, is not limited in its application to variable delivery pumps of the radial piston type and may be employed with any variable delivery pump which includes regulating means movable for varying its rate of delivery. The regulating means included in the exemplary pump 10 comprises a shift ring 12 which is pivotally supported at 14 for movement by means of an arm 15 in one and an opposite direction. The shift ring 12 serves as an outer non-rotating track or retaining ring for a plurality of rotating radial pistons 16, 16 which are disposed respectively in cylinders 18, 18 formed in a constant speed rotor 20. The rotor 20 is power driven about a pintle 22 in a counterclockwise direction as shown in FIG. 1. The pintle 22 is provided with axially extending inlet and discharge passageways 24 and 26 respectively. When the arm 15 is engaged to move the shift ring 12 in said one direction (counterclockwise pivotal movement of said ring in FIG. 1), its eccentricity relative to the center of rotation of the rotor 20 is increased and the stroke of the pistons 16, 16 is correspondingly increased whereby to increase the rate of delivery of the pump. Pivotal movement of the shift ring 12 in the opposite or clockwise direction in FIG. 1 serves to decrease the eccentricity of the ring 12 relative to the center of rotation of the rotor 12, to decrease the stroke of the pistons 16, 16 and thus to decrease the rate of delivery of the pump.

There is also schematically illustrated in FIG. 1 a supply line or conduit 28 and a metering valve 30 disposed in said line or conduit. The conduit 28 is connected either directly or indirectly with the discharge side of the variable delivery pump 10 in a manner not shown and serves one or more devices requiring fluid under pressure for their operation. The metering valve 30 may take various forms and its position may be adjusted in the conduit in keeping with the fluid flow and pressure requirements of the devices served by said conduit by a variety of valve operating means, the details of construction and operation of the said valve and operating means therefor forming no part of the present invention.

In the form shown in FIG. 1, the control means of the present invention comprises first and second equal pressure area pistons 32 and 34 which respectively urge the shift ring arm 15 in said one and opposite directions or leftwardly and rightwardly in FIG. 1. The first piston 32 is slidably disposed in a housing or cylinder 36 and the second piston 34 is similarly slidably disposed in a housing or cylinder 38. A first actuating chamber 40 defined by the piston 32 and the housing 36 is connected with the supply conduit 28 downstream of the metering valve 30 by a first conduit 42. Thus, fluid at substantially metering valve downstream pressure acts on the piston 32 in the said actuating chamber to urge the said piston and the shift ring arm 15 in said one direction. The first piston 32 is also urged in said one direction or leftwardly by a substantially constant force means such as a spring 44 disposed in the chamber 40. A second actuating chamber 46 defined by the second piston 34 and by its housing or cylinder 38 receives fluid at substantially metering valve upstream pressure through a second conduit 48, the said fluid acting within said second actuating chamber to urge the piston 34 in said opposite direction.

It will be apparent that the position of the shift ring arm 15 and that of the ring 12 will be adjusted by the pistons 32 and 34 to vary the rate of delivery of the pump 10 as required to maintain a substantially constant pressure drop across the metering valve 30. It will be further apparent that the magnitude of the pressure drop maintained across the said valve will be predetermined by the selection of the biasing spring 44. If the pressure drop across the said metering valve exceeds the predetermined level, the pistons 32 and 34 will move in said opposite direction or rightwardly and will reduce the rate of delivery of the pump 10 until the pressure drop is returned to the said level. Conversely, a reduction in the pressure drop across the valve 30 will cause the pistons 32 and 34 to be moved in said one direction or leftwardly and the rate of the delivery of the pump 10 will be increased until the pressure drop across the metering valve has returned to the predetermined level. Obviously, if the spring 44 is relatively heavy, or provides a large biasing force, the pressure drop across the metering valve will be maintained substantially constant at a comparatively high level. On the other hand, a light biasing spring will result in a relatively low constant pressure drop across the valve 30.

By judicious selection of the biasing spring 44, a constant pressure drop across the metering valve may be provided which will insure that the fluid flow and pressure requirements of devices served by the supply line 28 will be satisfied for all conditions of their operation. The rate of delivery of the pump 10 will be varied substantially in keeping with the varying requirements of the devices served by the supply conduit 28 and operation of the pump at high rates of delivery when such pump operation is not required will be avoided.

While the control means as shown in FIGURE 1 includes first and second pistons 32 and 34 having equal pressure areas, it is to be understood that the invention is not so limited. Pistons having unequal pressure areas may be provided as well as other modifications may be made in the control means so that the pressure drop across the metering valve 30 will be varied in accordance with various predetermined schedules, the invention not being limited to control means for maintaining a substantially constant pressure drop across the metering valve.

Preferably a pressure relief means is included in the control means of FIG. 1 for preventing excessive fluid pressures in the supply conduit 28 downstream of the metering valve 30. A branch conduit 50 extends from the first conduit 42 to a pressure relief valve 52 which includes a valve member 54 biased by a spring 56 to a normal position wherein it closes the branch conduit 50. When the fluid pressure in the line 28 downstream of the metering valve 30 and hence the pressure in the conduits 42 and 50 exceeds a predetermined level, the valve member 54 is moved against the bias of the spring 56 to open the said branch conduit to a chamber 58 within a housing 60 of the relief valve. The chamber 58 communicates with a drain line or conduit 62 and when the valve member 54 is moved as described to provide communication between said chamber and the branch conduit 50, fluid pressure within said branch conduit and the conduit 42 is thereby relieved. This results in a corresponding reduction in the fluid pressure in the first actuating chamber 40 and in movement of the pump shift ring 12 in its said opposite direction to a position wherein the delivery of the said pump is reduced to a minimum or zero level.

There is preferably provided in the conduit 42 between the supply conduit 28 and the branch conduit 50, a restriction 64. It will be seen that the said restriction serves to provide a sharp reduction in the fluid pressure in the conduit 42 and actuating chamber 40 when the relief valve 52 opens. In addition, the said restriction prevents a complete loss of fluid pressure in the supply line 28 downstream of the metering valve 30 upon opening of the relief valve 52.

In FIG. 2 wherein an alternative form of the control means of the present invention is illustrated, a portion of a pump shift ring 12a and a shift ring arm 15a are shown. The ring 12a and the arm 15a form a part of a variable delivery pump (not shown) which may be identical in construction and operation with the exemplary pump 10 of FIG. 1, but which is in reversed position with respect to the said pump 10. That is, movement of the arm 15a and ring 12a toward the right in FIG. 2 increases the rate of delivery of the pump while movement of said arm and ring toward the left decreases the rate of delivery of the pump. A supply line or conduit 28a is connected with the discharge side of the pump and with one or more devices requiring pressurized fluid for their operation, and disposed in the said supply line or conduit is a metering valve 30a.

First and second pistons 66 and 68 included in the alternative control means of FIG. 2 respectively urge the shift ring arm 15a in one and an opposite direction or rightwardly or leftwardly respectively for increasing and decreasing the delivery rate of the pump. As shown, the first piston 66 has a pressure area substantially smaller than that of the second piston 68, but the pressure areas of said two pistons are not necessarily so related as will be explained more fully hereinbelow. A housing or cylinder 70 for the first piston 66 cooperates with said piston to define a first actuating chamber 72 which is connected by a first conduit 74 with the supply conduit 28a upstream of the metering valve 30a. Thus, fluid at metering valve upstream pressure acts within the actuating chamber 72 to urge the piston 66 and the shift ring arm 15a rightwardly for increasing the rate of delivery of the pump. A housing or cylinder 76 for the second piston 68 cooperates therewith to define a second actuating chamber 78 which is connected by a second conduit 80 with a control valve indicated generally at 82.

The control valve 82 is operable responsive to fluid pressure on opposite sides of the metering valve 30a in the supply conduit 28a to vary the fluid pressure in the second actuating chamber 78 and thereby to adjust the position of the arm 15a and the shift ring 12a and to vary the rate of delivery of the pump and regulate the pressure drop across the said metering valve. More specifically, the said control valve, in the preferred construction shown in FIG. 2, is operable to vary the fluid pressure in the chamber 78 and thus vary the rate of delivery of the pump so that the pressure drop across the metering valve 30a is maintained at a substantially constant level.

A spool-like valve member 84 of the control valve 82 is slidable in one and an opposite direction or rightwardly and leftwardly in a valve housing 86 and has an axially elongated body portion 88 and annularly enlarged left and right hand end portions 90 and 92 of equal diameter. The annularly enlarged left-hand end portion 90 of the valve member 84 cooperates with the housing 86 to define a first chamber 94 at the left of the valve member and the annularly enlarged right-hand end portion 92 cooperates with said housing to define a second chamber 96 at the right of said valve member. A third chamber 98 is defined between the left and right hand annular enlargements 90 and 92 and about the body portion of the valve member by said member and by the housing 86. The first valve chamber 94 is connected with the conduit 74 by a branch conduit 100 and is thereby connected with the supply conduit 28a upstream of the metering valve 30a in said conduit. A conduit 102 connects the second valve chamber 96 with a pressure relief valve indicated generally at 104 and, as will be explained more fully hereinbelow, the relief valve 104 supplies fluid at metering valve downstream pressure to the conduit 102 and thence to the said chamber 96 under normal conditions of system operation. Disposed in the second chamber 96 is a biasing spring 105 which engages the right-hand enlargement 92 of the valve member 84 and urges said member leftwardly. The third chamber 98 communicates with a drain conduit or line 106.

It will be apparent that the valve member 84 will be urged rightwardly in the housing 86 by fluid at substantially metering valve upstream pressure acting on the left-hand enlargement 90 of said member in the first valve chamber 94. Fluid at substantially metering valve downstream pressure in the second valve chamber 96 assists the spring 105 in urging the said valve member in said opposite direction or leftwardly in the valve housing 86.

Connection of the conduit 80 extending from the second actuating chamber 78 with the housing 86 of the control valve 82 is effected in such manner that the left-hand annular enlargement 90 of said member selectively effects communication between said conduit and the first and third valve chambers 94 and 98 with movement of the valve member 84. That is, the said enlargement blocks the conduit 80 when the valve member is in a balanced or steady state condition but when the valve member 84 is moved rightwardly, the annular enlargement 90 opens the conduit 80 to the first valve chamber 94 and when the valve member is moved leftwardly the said enlargement interrupts communication between the conduit 80 and said first valve chamber and establishes communication between said conduit and the third valve chamber 98.

When the pressure drop across the metering valve 30a exceeds a predetermined level, as determined by the biasing spring 105, and the valve member 82 is resultantly moved rightwardly, the fluid pressure in the second actuating chamber 78 increases as fluid flows thereto from the supply conduit 28a through the conduit 74, the first valve chamber 94 and the conduit 80. Increased fluid pressure in the actuating chamber 78 results in movement of the pistons 66 and 68 and the arm 15a leftwardly and a decreased rate of delivery of the pump. As the pump rate of delivery decreases, the pressure drop across the metering valve decreases and the valve member 82 returns to the balanced or steady state position shown wherein the enlargement 90 blocks the conduit 80. When the pressure drop across the metering valve 30a falls below the aforesaid predetermined level, operation of the control valve and the pistons 66 and 68 is similar but in an opposite direction. The valve member 84 moves leftwardly and the conduit 80 is connected with the third valve chamber 98 and thus with the drain line 106. Fluid pressure in the second actuating chamber 78 decreases and the pistons 66 and 68, the arm 15a, and ring 12a are moved rightwardly to increase the rate of delivery of the pump. As the rate of delivery increases, the pressure drop across the metering valve increases and finally returns to the predetermined level whereupon the valve members 84 occupies its balanced or steady state position and the conduit 80 is blocked by the annular enlargement 90 of the said member.

Obviously, a wide variety of types of control valves may be employed for varying the fluid pressure in the second actuating chamber so that the rate of delivery of the pump will be varied as required to maintain a substantially constant pressure drop across the metering valve 30a and, accordingly, the invention is not be construed as limited to any particular type of control valve. It will also be obvious that when a control valve such as the valve 82 is employed, the second actuating chamber 78 may be connected through the said valve with a source of pressurized fluid other than the supply conduit 28a upstream of the metering valve 30a.

As indicated above, the invention also contemplates the provision of a control valve adapted to cause the rate of delivery of the pump to be varied so that the pressure drop across the metering valve is not maintained substantially constant, but is instead regulated in keeping with a predetermined schedule. One example of a control valve adapted to provide other than constant pressure regulation is a valve similar to the control valve 82, but with a valve member having a right-hand enlargement with a pressure area substantially larger than that of its left-hand enlargement. It will be apparent that when such a valve is employed, the rate of delivery of the pump will be regulated so as to vary the pressure drop across the metering valve in keeping with the metering valve downstream pressure.

The pressure relief valve 104 mentioned previously operates to prevent fluid pressure in the supply line 28a downstream of the metering valve 30a from exceeding a predetermined maximum level. When the said fluid pressure is less than the predetermined level or in a normal range, the valve 104 continuously supplies fluid at metering valve downstream pressure to the control valve 82. When the fluid pressure downstream of the metering valve in the line 28a exceeds the predetermined maximum level, the relief valve 104 interrupts communication between the said supply line and the control valve 82 and establishes communication between the control valve and a drain line. As will be explained more fully hereinbelow, this results in movement of the valve member 84 of the control valve and in movement of the pistons 66 and 68 and the shift ring arm 15a in the directions which result in a decrease in the rate of delivery of the pump to its minimum or zero rate.

A housing 108 of the relief valve 104 contains a spool-like valve member, indicated generally at 110, which has an elongated body portion 112 and equal area enlargements or lands 114 and 116 at its upper and lower ends respectively. The valve member 110 is slidable within the housing 108 and defines first, second and third chambers 118, 120 and 122 in cooperation with said housing. The first chamber 118 is disposed at the upper end of the housing 108 and receives fluid from the supply conduit 28a downstream of the metering valve 30a through a conduit 124, the said fluid acting on the upper end of the annular enlargement 114 of the valve member 110 and urging said member downwardly. The second chamber 120 is disposed between the annular enlargements 114 and 116 and about the body portion 112 of the valve member 110. A branch conduit 126 extends from the conduit 124 to said second chamber 120 and the conduit 102 extending from the second chamber 96 of the control valve 82 also communicates with the chamber 120. The branch conduit 126 is adapted to be opened and closed by the annular enlargement 114 with movement of the valve member 110, the said valve member being shown in a normal position wherein the conduit 126 is open to the chamber 120. The third chamber 122 is disposed at the lower end of the relief valve housing 108 and located within the said chamber is a biasing spring 128 which urges the valve member 110 upwardly against the pressure forces of the fluid in the first chamber 118. A first drain conduit 130 is connected with the third chamber 122 near the lower end of the housing 108 and a second drain conduit 132 is connected with the said housing above the drain conduit 130 and is adapted to be opened and closed by the lower valve member enlargement 116 with movement of the said valve member.

The valve member 110 assumes the normal position in which it is shown when the fluid pressure in the supply line 28a downstream of the metering valve 30a and in the first chamber 118 of the relief valve is below a maximum level determined by the spring 128. In this position, the conduit 102 is connected with the branch drain 126 through the second valve chamber 120 and the second control valve chamber 96 is thereby supplied with fluid at metering valve downstream pressure. The second drain conduit 132 is opened to the third valve chamber 122 as shown.

When the fluid pressure in the supply line 28a downstream of the metering valve 30a exceeds the aforesaid maximum level, fluid in the first valve chamber 118 acts on the upper valve member enlargement 114 to overcome the opposing force of the spring 128 and urges the valve member 110 downwardly. When the valve member is urged downwardly in such manner, the upper annular enlargement 114 thereon blocks the branch conduit 126 and the lower annular enlargement 116 on said valve member opens the second drain conduit 132 to the second valve chamber 120. Thus the fluid pressure in said second chamber 120 and in the conduit 102 and the second control valve chamber 96 is reduced to drain pressure. Movement of the valve member 84 of the control valve 82 rightwardly follows reduction of the pressure in the chamber 96 and the fluid pressure in the second actuating chamber 78 associated with the piston 68 is thereby increased to cause movement of the said piston 68, the piston 66, and the shift ring arm 15a leftwardly and reduction in the rate of delivery of the pump to a minimum or zero rate.

From the foregoing, it will be apparent that both the control means of FIG. 1 and the alternative control means of FIG. 2 serve to vary the rate of delivery of a variable delivery pump so as to regulate the pressure drop across a valve which meters pump discharge fluid in a simple and direct manner. The control means of FIG. 1 provides accuracy of regulation which is satisfactory for many fluid pressure systems. The alternative control means of FIG. 2, while slightly more complicated than the control means of FIG. 1, may be expected to provide increased accuracy of regulation of the pressure drop across the metering valve and may be employed to advantage in fluid pressure systems wherein an extremely high degree of accuracy is required. It will be observed that the control means of FIGS. 1 and 2 include different types of pressure relief valves 52 and 104. The relief valves 52 and 104, as well as other types of relief valves, may be used interchangeably with the control means of both FIG. 1 and FIG. 2.

It will be further apparent that both the control means of FIG. 1 and the alternative control means of FIG. 2 may be employed in fluid pressure systems wherein a plurality of supply conduits for fluid pressure operated devices, each having metering valves associated therewith, are supplied with pressurized fluid from a single variable delivery pump. In such case, conduits extending to the control means from each of the several supply conduits on upstream and downstream sides of the metering valves therein could each be provided with a check valve so that the control means might operate in response to the highest upstream and downstream fluid pressures prevailing in the supply conduits at any given instant in time.

The invention claimed is:

1. A control system for use in a fluid pressure system comprising a metering valve in a fluid conduit and a regulating means movable in one and an opposite direction respectively for increasing and decreasing the supply of fluid to the metering valve, said control system comprising first and second piston means operatively associated with said regulating means and respectively urging the same in said one and opposite directions, said second piston means having a pressure area substantially greater than that of said first piston means, means defining first and second actuating chambers respectively for said first and second piston means, means defining a first fluid passageway connecting said conduit upstream of said metering valve with said first actuating chamber, means defining a second fluid passageway connecting said second actuating chamber with said first fluid passageway, a control valve in said second fluid passageway adapted to regulate the fluid pressure in said second actuating chamber by selectively connecting said second passageway with said first passageway and with a drain line so that the position of said regulating means is adjusted as required to maintain a substantially constant pressure drop across said metering valve, the said control valve comprising a valve member movable in one and an opposite direction in a housing respectively for connecting said second passageway with said first passageway and the drain line and defining in cooperation with the housing first and second chambers adapted to receive pressurized fluid for urging said valve member in said one and opposite directions respectively and also comprising spring means urging said valve member in said opposite direction, and means defining third and fourth fluid passageways respectively connecting said first and second control valve chambers with said fluid conduit upstream and downstream of said metering valve.

2. A control system for use in a fluid pressure system comprising a metering valve in a fluid conduit and a regulating means movable in one and an opposite direction respectively for increasing and decreasing the supply of fluid to the metering valve, said control system comprising first and second piston means operatively associated with said regulating means and respectively urging the same in said one and opposite directions, said second piston means having a pressure area substantially greater than that of said first piston means, means defining first and second actuating chambers respectively for said first and second piston means, means defining a first fluid passageway connecting said conduit upstream of said metering valve with said first actuating chamber, means defining a second fluid passageway connecting said second actuating chamber with said first fluid passageway, a control valve in said second fluid passageway adapted to regulate the fluid pressure in said second actuating chamber by selectively connecting said second passageway with said first passageway and with a drain line so that the position of said regulating means is adjusted as required to maintain a substantially constant pressure drop across said metering valve, the said control valve comprising a valve member movable in one and an opposite direction in a housing respectively for connecting said second passageway with said first passageway and the drain line and defining in cooperation with the housing first and second chambers adapted to receive pressurized fluid for urging said valve member in said one and opposite directions respectively and also comprising spring means urging said valve member in said opposite direction, means defining third and fourth fluid passageways respectively connecting said first and second control valve chambers with said fluid conduit upstream and downstream of said metering valve, and a pressure relief valve in said fourth fluid passageway which is adapted to close said passageway and to connect said second control valve chamber with a drain line when the fluid pressure in the passageway exceeds a predetermined maximum level.

References Cited in the file of this patent

UNITED STATES PATENTS

| 2,012,978 | Veenschoten | Sept. 3, 1935 |
| 2,114,443 | Foisy | Apr. 19, 1938 |
| 2,238,061 | Kendrick | Apr. 15, 1941 |
| 2,238,063 | Kendrick | Apr. 15, 1941 |
| 2,266,871 | Krogh | Dec. 23, 1941 |
| 2,502,546 | Adams | Apr. 4, 1950 |
| 2,600,632 | French | June 17, 1952 |
| 2,600,633 | French | June 17, 1952 |
| 2,621,632 | Ifield | Dec. 16, 1952 |
| 2,658,483 | Harris | Nov. 10, 1953 |
| 2,661,725 | Bowditch | Dec. 8, 1953 |
| 2,678,533 | Lawrence | May 18, 1954 |
| 2,799,995 | Herman | July 23, 1957 |
| 2,889,780 | Binford | June 9, 1959 |

FOREIGN PATENTS

| 628,925 | Great Britain | Sept. 7, 1949 |